United States Patent
Beaven et al.

(10) Patent No.: US 6,493,714 B1
(45) Date of Patent: Dec. 10, 2002

(54) DATA PROCESSING WITH MESSAGE PROCESSING NODES WRAPPED INTO A BUSINESS ACTIVITY

(75) Inventors: John Anthony Beaven, Romsey (GB); Amanda Elizabeth Chessell, Alton (GB); Catherine Griffin, Romsey (GB); Iain Stuart Caldwell Houston, Sherborne (GB); Martin Mulholland, Winchester (GB); Ian Robinson, Southampton (GB); David John Vines, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/466,546

(22) Filed: Dec. 17, 1999

(30) Foreign Application Priority Data

Nov. 30, 1999 (GB) .............................. 9928226

(51) Int. Cl.⁷ ............................................ G06F 17/30
(52) U.S. Cl. ....................................................... 707/10
(58) Field of Search ........................ 707/10, 100, 104.1, 707/5; 709/246, 207

(56) References Cited

U.S. PATENT DOCUMENTS

| | | | | |
|---|---|---|---|---|
| 5,627,764 A | * | 5/1997 | Schutzman et al. | 709/207 |
| 5,893,911 A | | 4/1999 | Piskiel et al. | 707/10 |
| 5,913,061 A | | 6/1999 | Gupta et al. | 709/310 |
| 6,185,558 B1 | * | 2/2001 | Bowman et al. | 707/5 |
| 6,199,068 B1 | * | 3/2001 | Carpenter | 707/100 |
| 6,256,676 B1 | * | 7/2001 | Taylor et al. | 709/246 |

FOREIGN PATENT DOCUMENTS

GB          2 336 920          11/1999          ......... G06F/17/30

OTHER PUBLICATIONS

Sagavista tech sheet "Cohesive Architecture for Enterprise Application Integration" from http://www.sagasoftware.com/site/solution/som/sagavista/v_tsh.htm website, pp 1–8, 1999.

Sagavista and Solutions–Oriented Middleware "Intelligently Connecting the Enterprise" from http://www.sagasoftware.com/site/solution/som/sagavista/v_wp.htm website, pp 1–6, 1999.

Sagavista fact sheet from http://www.sagasoftware.com/site/solution/som/sagavista/v_facts.htm website pp 1–3, 1999.

"SAGA Systems, Inc. Patricia Seybold Group (PSG) Advises Organizations Shopping for a Comprehensive Integration Solution to Take a Close Look at Sagavista" from http://www.sagasoftware.com/site/news/press/june22a_99.htm website, pp 1–3, 1999.

"TIBCO Reveals TIB/MessageBroker for Event–Driven Content Based Routing and Transformation" from http://www.tibco.com/press/releases/press61.html, pp 1–2, 1999.

* cited by examiner

*Primary Examiner*—Diane D. Mizrahi
(74) *Attorney, Agent, or Firm*—Edward H. Duffield

(57) ABSTRACT

A data processing apparatus for carrying out a specific business logic data processing task, has a plurality of business activities running on at least one data processing machine, each activity communicates with other activities via a communications protocol in order to carry out the specific business logic data processing task. At least one of the activities includes a plurality of message broker data processing nodes.

16 Claims, 1 Drawing Sheet

DATA PROCESSING WITH MESSAGE PROCESSING NODES WRAPPED INTO A BUSINESS ACTIVITY

FIELD OF THE INVENTION

The invention relates to the data processing field, and more specifically, to the field of developing and using a distributed business logic application made up of a plurality of inter-communicating business activities for carrying out a specific business logic data processing task.

BACKGROUND OF THE INVENTION

In modern data processing systems a specific business logic data processing task (e.g., a customer order entry and processing task) is often handled by software which is distributed over a plurality of data processing machines which are inter-communicating with each other via a network (such as the Internet). In constructing such a distributed business logic data processing application, business "activities" are commonly used. An activity is a reusable component of work which performs some specified business task in the context of other activities. In other words, a number of activities can be constructed (potentially independently) and then assembled together to produce a logical business application. An activity can communicate with another activity in the system via some well-defined protocol (for example, a message-based communication system, or TCP/IP). Such a composed application can then be deployed on the available middleware to form a running system.

As an example in the customer order entry area, one activity might accept the customer's order for a specific product, another activity might do some initial processing of the order to make sure the order is valid (and ask the customer for revised information if the order is not valid), and yet another activity will contact the billing and shipment departments for further processing of the order. Each of these activities might advantageously be located on a separate machine in a separate geographic location.

When writing the software code for the respective activities, the software programmer needs to expend considerable development effort, time and expense in actually writing the code to accomplish the business logic for the respective activities.

SUMMARY OF THE INVENTION

According to one aspect, the invention provides a data processing apparatus for carrying out a specific business logic data processing task, comprising a plurality of business activities running on at least one data processing machine, each activity communicates with other activities via at least one communications protocol in order to carry out the specific business logic data processing task, wherein at least one of the activities includes a plurality of message broker data processing nodes.

According to a second aspect, the invention provides a computer program product for, when run on a computer, carrying out the functionality recited with respect to the apparatus of the first aspect.

According to a third aspect, the invention provides a data processing method comprising steps of: receiving a client request within a first business activity which is part of a network of inter-communicating business activities which carry out a specific business logic data processing task; processing the client request within the first business activity; and forwarding the client request to another business activity in the network of inter-communicating business activities; wherein at least one of the activities includes a plurality of message broker data processing nodes.

According to a fourth aspect, the invention provides a computer readable storage medium for, when run on at least one computer, instructing the at least one computer to carry out the steps of the third aspect.

Thus, with the present invention, because message broker data processing nodes are placed within a business activity, in a network of inter-communicating business activities, the message broker nodes become an integral part of the overall business logic application. Previously, a fully written business logic application was deployed on available middleware (such as a message broker) with the middleware being used only as a platform for running the fully written business logic application. In contrast, the present invention places such message broker nodes directly in the business logic application (as an integral part thereof).

Thus, the flexible and powerful message broker data processing nodes can be re-used in the business logic activity (or activities) in a very simple and straightforward way, saving much development effort since the developer of the business logic application can place message broker functionality into his business application without needing to separately write the code to achieve such functionality. For example, should the business logic application developer wish to have a message format transformation function added to his business logic application, he/she does not need to write such code from scratch, instead, he/she need only take a pre-existing format transformation message broker data processing node and place it in one of the activities of the business logic application.

BRIEF DESCRIPTION OF THE DRAWINGS

A preferred embodiment of the present invention will now be described with reference to the following drawing figure.

DETAILED DESCRIPTION OF THE PREFERRED EMBODIMENTS

Figure 1:
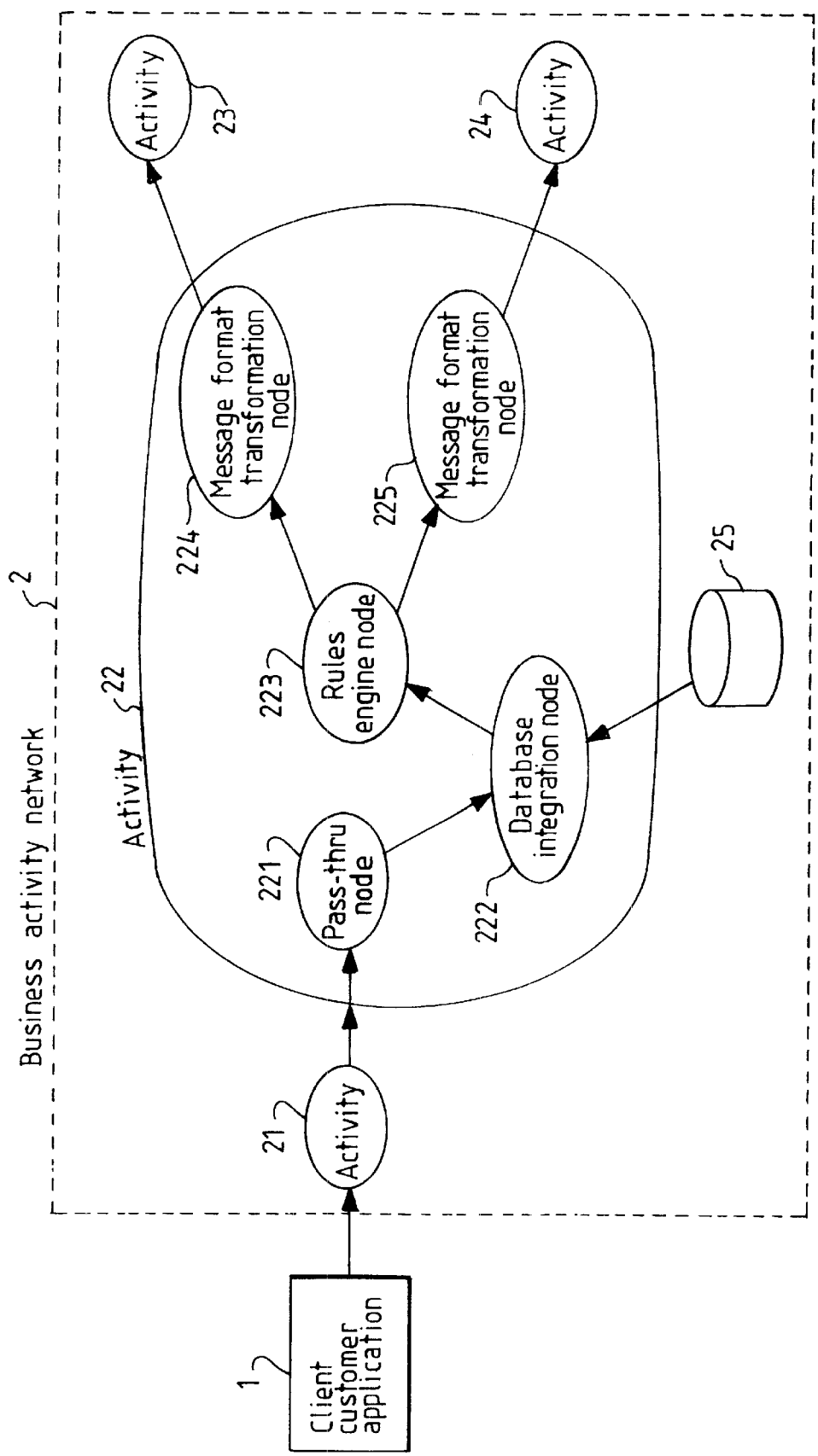
FIG. 1 shows a network of inter-communicating business activities according to a preferred embodiment of the present invention.

In FIG. 1 a network 2 of inter-communicating business activities 21, 22, 23 and 24 is shown in communication with a client customer application 1. Each of the client application 1 and the business activities 21 to 24 could be running on a separate data processing machine and thus be in communication via a network (not shown) such as the Internet or such as a messaging and queuing network (such as IBM's well known MQSeries (TM) product). Alternatively, some or all of the client application 1 and the business activities 21 to 24 could be running on the same data processing machine.

The network 2 of inter-communicating business activities is, in this illustrative example, carrying out a distributed business logic application which is a customer order entry application, for use in an electronic commerce environment, i.e., taking a customer's order, processing it, contacting the billing department so that a bill can be sent to the customer, and contacting the shipping department so that the product can be retrieved from a warehouse, packaged and shipped to the customer.

Client customer application 1 sends an order for a particular product to a first activity 21 in the network 2 of business activities. Activity 21 accepts the order and validates the order to make sure that all of the required information is included in the order (i.e., the customer's name, shipping address, credit card details, customer number, etc., and makes sure that the product requested is actually a product which the seller company still offers for sale). Once the customer order has been validated, activity 21 then forwards the order on to activity 22 for further processing as part of the overall distributed business logic application.

Activity 22 includes a plurality of message broker data processing nodes, which include: pass-through node 221, database integration node 222, rules engine node 223, message format transformation node 224 and message format transformation node 225. These message broker data processing nodes are well known pre-existing units of functionality that are in common use in middleware message brokers currently on the market. That is, multi-function message broker systems are used to inter-connect applications which may be on heterogeneous platforms and may use different message formats. For example, Saga Software of Reston, Va. (USA) (www.sagasoftware.com) have such a message broker product called "Sagavista" (a trademark of Saga Software). Further, Tibco Software Inc. of Palo Alto, Calif. (USA)(www.tibco.com) also have such a message broker called "TIB/Message Broker" (both "TIB" and "TIB/Message Broker" are trademarks of Tibco). See also, IBM's published United Kingdom patent application GB 2,336,920 A, which is herein incorporated by reference. In these multi-function message brokers, a set of pluggable data processing nodes is provided, with each node being dedicated to a specific data processing task, such as message format transformation, publish/subscribe message distribution, and a rules engine for deciding (based on a plurality of predefined rules) where an incoming message should be routed.

The message broker data processing nodes 221 to 225 are commonly used in middleware message brokers, but have not before been used as an integral part of the business logic application which, when written, would then be taken and deployed on such middleware. The preferred embodiment of the present invention takes pre-existing message broker middleware data processing nodes and makes them an integral part of at least one business activity in a network of inter-communicating business activities. Activity 22 is used as an illustrative example in FIG. 1, but in practice, more than one activity can have message broker data processing nodes included therein.

Returning to the discussion of the customer order processing, activity 22's pass through node 221 receives the customer order from activity 21 and passes the order along unchanged to the database integration node 222. Pass through node 221 is a well known message broker node which carries out the function of receiving a message and passing such message through the node unchanged (for example, it is commonly used as an introductory node which receives data from outside of the set of message broker data processing nodes).

Database integration node 222 receives the customer order from the pass through node 221 and performs an integration operation whereby the customer order is integrated with data from a database 25 (e.g., a computer memory stored locally to the data processing machine that is running the database integration node 222 software). The purpose of this integration could be, for example, to determine what this particular customer has previously bought from this particular seller so that a decision can be made as to whether this customer is entitled to a discount. The customer's stored information in the database 25 is accessed based on the customer-identifying data included in the customer order. The customer's stored data is then added to the customer order. The so-augmented customer order is then output of the database integration node 222 for further processing by other data processing nodes. The database integration node 222 is a well known message broker data processing node and is described, for example, in GB 2,336,920 A, mentioned above.

Once the augmented customer order is output from the database integration node 222, it is received by the rules engine node 223 which applies rules to the received customer order to determine which further nodes a particular order should be forwarded to next. For example, one rule is if the customer is located in the United States, then that customer's order should be forwarded to message format transformation node 224, because node 224 carries out the function of transforming all currency amounts from United Kingdom pounds (the local currency of the seller) to United States dollars (the preferred currency of the customer). Another rule, in the example of FIG. 1, is if the customer is located in Japan, then that customer's order should be forwarded to message format transformation node 225, because node 225 carries out the function of transforming all currency amounts from United Kingdom pounds (the local currency of the seller) to Japanese yen (the preferred currency of the customer).

After being output from node 224, the order where the customer is in the United States is sent outside of the activity 22 to activity 23 which carries out the business logic functionality of performing further processing (billing/shipping) to the United States customer. Likewise, after being output from node 225, the order where the customer is in Japan is sent outside of the activity 22 to activity 24 which carries out the business logic functionality of performing further processing (billing/shipping) to the Japanese customer. Two separate activities 23/24 are used for such further processing because the specifics of the processing are likely to be different because of the geography difference (US/Japan). For example, the seller, located in the United Kingdom, might have a subsidiary located in the United States and another subsidiary located in Japan, and the respective activities 23, 24 would be running on machines located in the respective countries. This would save on postage costs, for example, because there would be no international shipping involved, since the United States subsidiary would ship to United States customers and the Japanese subsidiary would ship to Japanese customers.

The rules engine node 223 and the message format transformation nodes discussed above are well known message broker data processing nodes used in the message brokers cited above (by Tibco and Sagavista). U.S. Pat. No. 5,893,911 (assigned to Neon Software Inc.), which is herein incorporated by reference, also teaches the use of such message broker data processing nodes.

We claim:

1. A data processing apparatus for carrying out a specific business logic data processing task, comprising a plurality of business activities running on at least one data processing machine, each activity communicates with other activities via at least one communications protocol in order to carry out the specific business logic data processing task, wherein at least one of the activities includes a plurality of message broker data processing nodes.

2. The apparatus of claim 1, wherein one of said message broker data processing nodes is a message format transformation node.

3. The apparatus of claim 1, wherein one of said message broker data processing nodes is a database integration node.

4. The apparatus of claim 1, wherein one of said message broker data processing nodes is a rules engine node.

5. A computer program product comprising:
- a computer usable medium having computer readable program code means embodied in said medium for causing the carrying out of a specific business logic data processing task, said computer program product having:
- computer readable program code means for causing a plurality of business activities to be run on at least one data processing machine, each activity communicates with other activities via a communications protocol in order to carry out the specific business logic data processing task, wherein at least one of the activities includes a plurality of message broker data processing nodes.

6. The computer program product of claim 5, wherein one of said message broker data processing nodes is a message format transformation node.

7. The computer program product of claim 5, wherein one of said message broker data processing nodes is a database integration node.

8. The computer program product of claim 5, wherein one of said message broker data processing nodes is a rules engine node.

9. A data processing method comprising steps of:
- receiving a client request within a first business activity which is part of a network of inter-communicating business activities which carry out a specific business logic data processing task;
- processing the client request within the first business activity; and
- forwarding the client request to another business activity in the network of inter-communicating business activities;
- wherein at least one of the activities includes a plurality of message broker data processing nodes.

10. The method of claim 9, wherein one of said message broker data processing nodes is a message format transformation node.

11. The method of claim 9, wherein one of said message broker data processing nodes is a database integration node.

12. The method of claim 9, wherein one of said message broker data processing nodes is a rules engine node.

13. A computer readable storage medium for, when run on at least one computer, instructing the at least one computer to carry out the steps of:
- receiving a client request within a first business activity which is part of a network of inter-communicating business activities which carry out a specific business logic data processing task;
- processing the client request within the first business activity; and
- forwarding the client request to another business activity in the network of inter-communicating business activities;
- wherein at least one of the activities includes a plurality of message broker data processing nodes.

14. The computer program product of claim 13, wherein one of said message broker data processing nodes is a message format transformation node.

15. The computer program product of claim 13, wherein one of said message broker data processing nodes is a database integration node.

16. The computer program product of claim 13, wherein one of said message broker data processing nodes is a rules engine node.

* * * * *